United States Patent [19]

Evans

[11] Patent Number: 5,170,878
[45] Date of Patent: Dec. 15, 1992

[54] METHOD OF HYDROSTATIC COOKER DISCHARGE

[75] Inventor: Donald E. Evans, Hilliard, Ohio

[73] Assignee: Don Evans & Associates, Inc., Hilliard, Ohio

[21] Appl. No.: 791,266

[22] Filed: Nov. 12, 1991

Related U.S. Application Data

[62] Division of Ser. No. 453,391, Dec. 18, 1989, abandoned.

[51] Int. Cl.⁵ .............................................. B65G 47/24
[52] U.S. Cl. .................................... 198/407; 198/408; 198/432
[58] Field of Search ........................ 198/407, 408, 432

[56] References Cited

U.S. PATENT DOCUMENTS

| | | |
|---|---|---|
| 1,200,244 | 10/1916 | Sears ............................... 198/432 X |
| 1,389,447 | 8/1921 | Johnson . |
| 1,480,186 | 1/1924 | Smith . |
| 2,154,978 | 4/1939 | Galvin . |
| 2,468,794 | 5/1949 | Wilbur . |
| 2,575,863 | 11/1951 | Clifcorn . |
| 2,632,378 | 3/1953 | Carvallo . |
| 2,759,594 | 8/1956 | Kleboe et al. . |
| 2,771,645 | 11/1956 | Martin . |
| 2,814,980 | 12/1957 | Reed . |
| 2,835,003 | 5/1958 | Abrams . |
| 2,861,670 | 11/1958 | Read et al. .......................... 198/408 |
| 2,951,353 | 9/1960 | Morrison . |
| 3,124,231 | 3/1964 | Ott, Jr. . |
| 3,286,619 | 11/1966 | Lee . |
| 3,319,763 | 5/1967 | Van Der Winden ............... 198/408 |
| 3,613,551 | 10/1971 | Reimers . |
| 3,894,628 | 7/1975 | Pugh et al. ......................... 198/407 |
| 3,970,188 | 7/1976 | Smorenburg . |
| 3,972,679 | 8/1976 | Ruiz . |
| 4,415,539 | 11/1983 | Pohorski . |
| 4,457,419 | 7/1984 | Ogami et al. . |
| 4,803,055 | 2/1989 | Ueda . |
| 4,823,940 | 4/1989 | Cretser . |
| 5,029,694 | 7/1991 | Gomez ............................... 198/408 |
| 5,040,662 | 8/1991 | Clark et al. ......................... 198/408 |
| 5,050,724 | 9/1991 | Nordstrom .......................... 198/407 |
| 5,097,942 | 3/1992 | Codde .............................. 198/432 X |

FOREIGN PATENT DOCUMENTS 147911  3/1960  U.S.S.R. .

Primary Examiner—D. Glenn Dayoan
Attorney, Agent, or Firm—Litman, McMahon & Brown

[57] ABSTRACT

A hydrostatic cooker discharge apparatus includes a flight conveyor, a first belt conveyor and a second belt conveyor. The flight conveyor sequentially receives horizontally oriented sticks of containers from a cooker. The first belt conveyor in conjunction with the flight conveyor transports the stick containers to a waterfall structure whereat the containers are reoriented to an upright position and are individually placed on the second belt conveyor for removal from the cooker area.

2 Claims, 4 Drawing Sheets

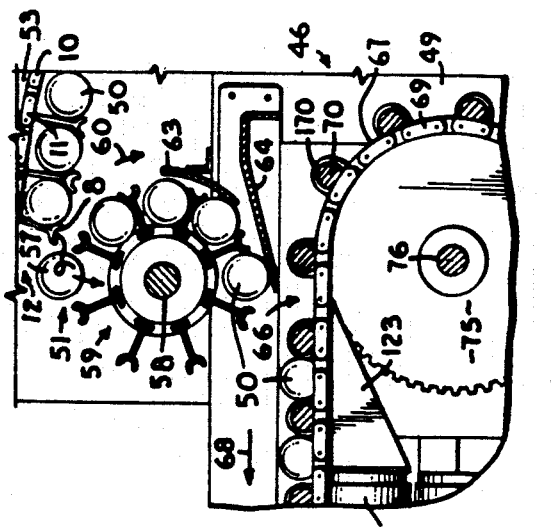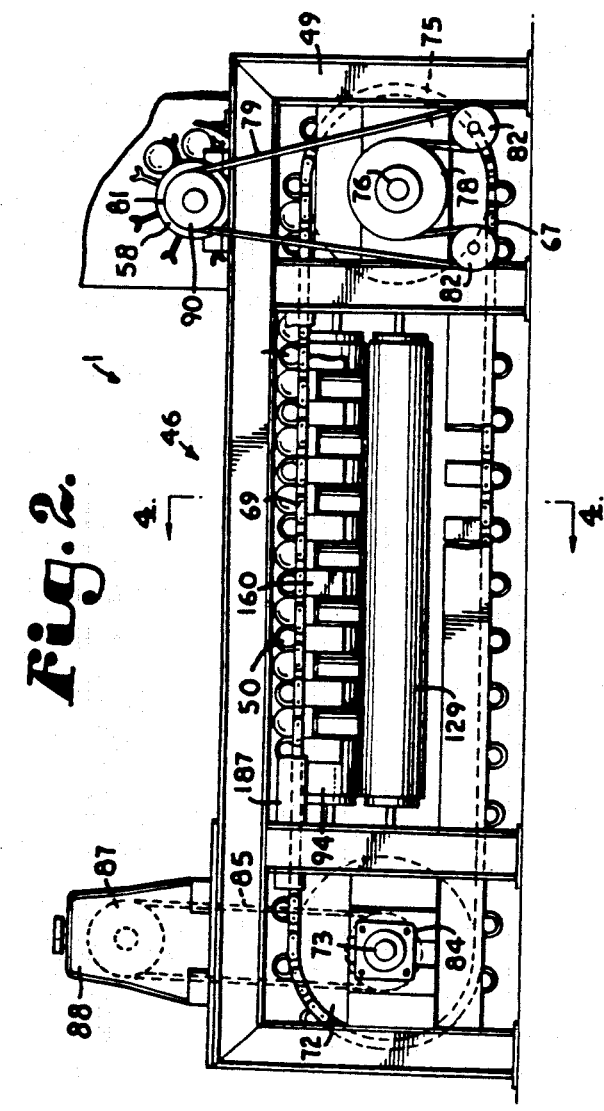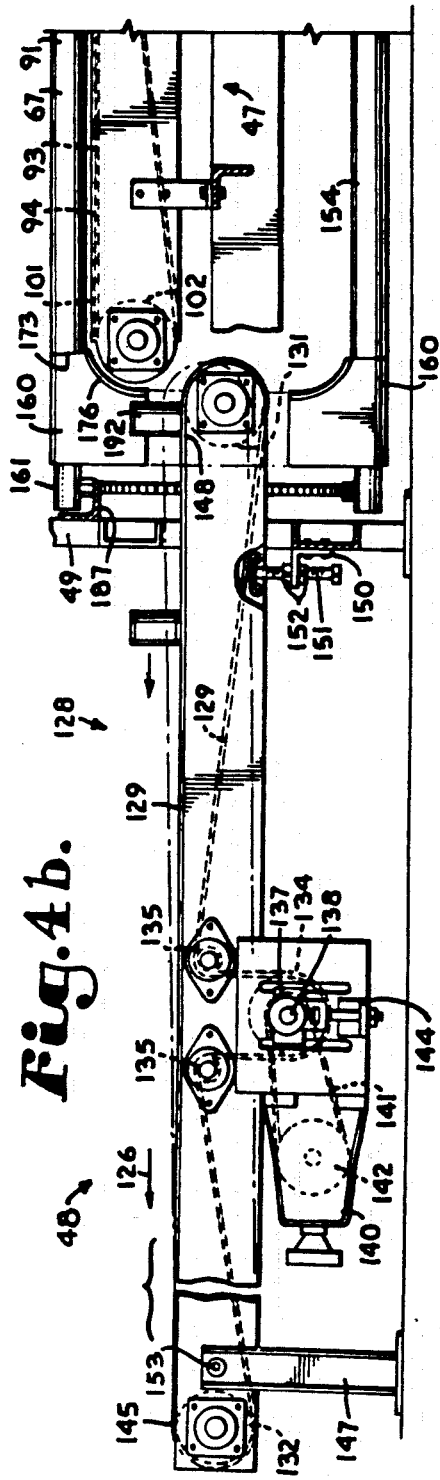

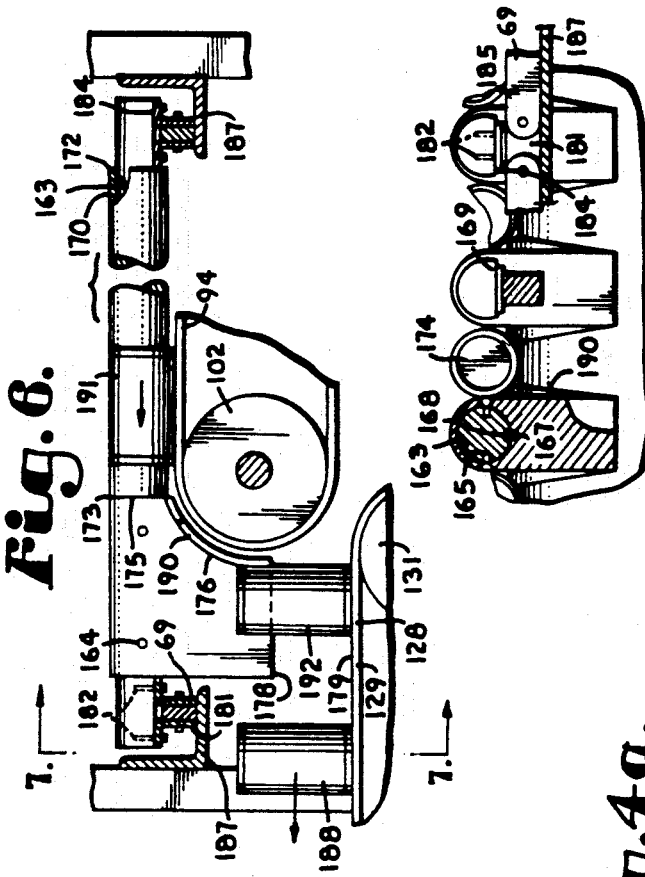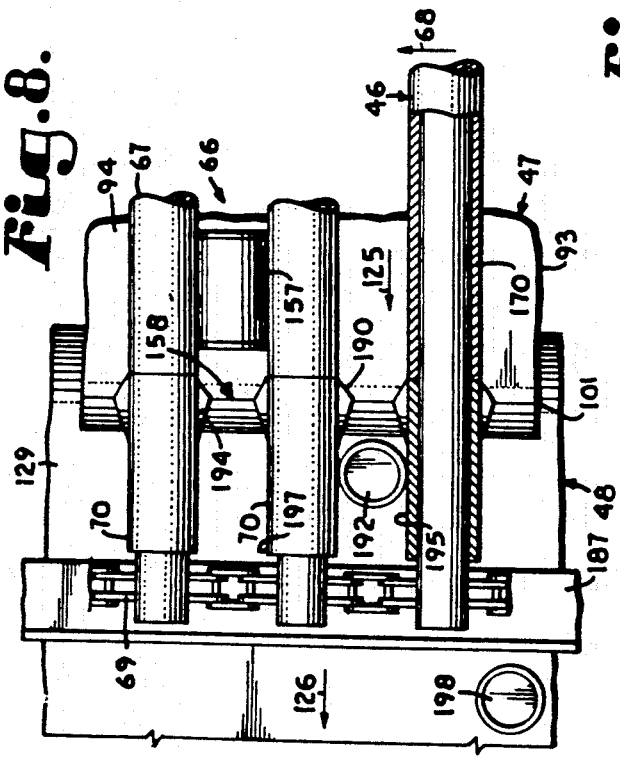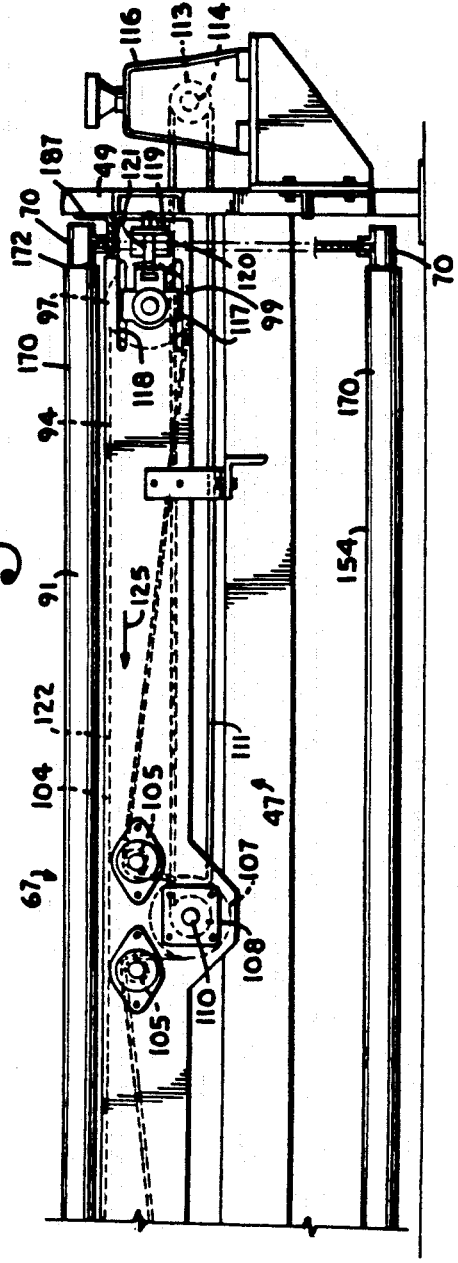

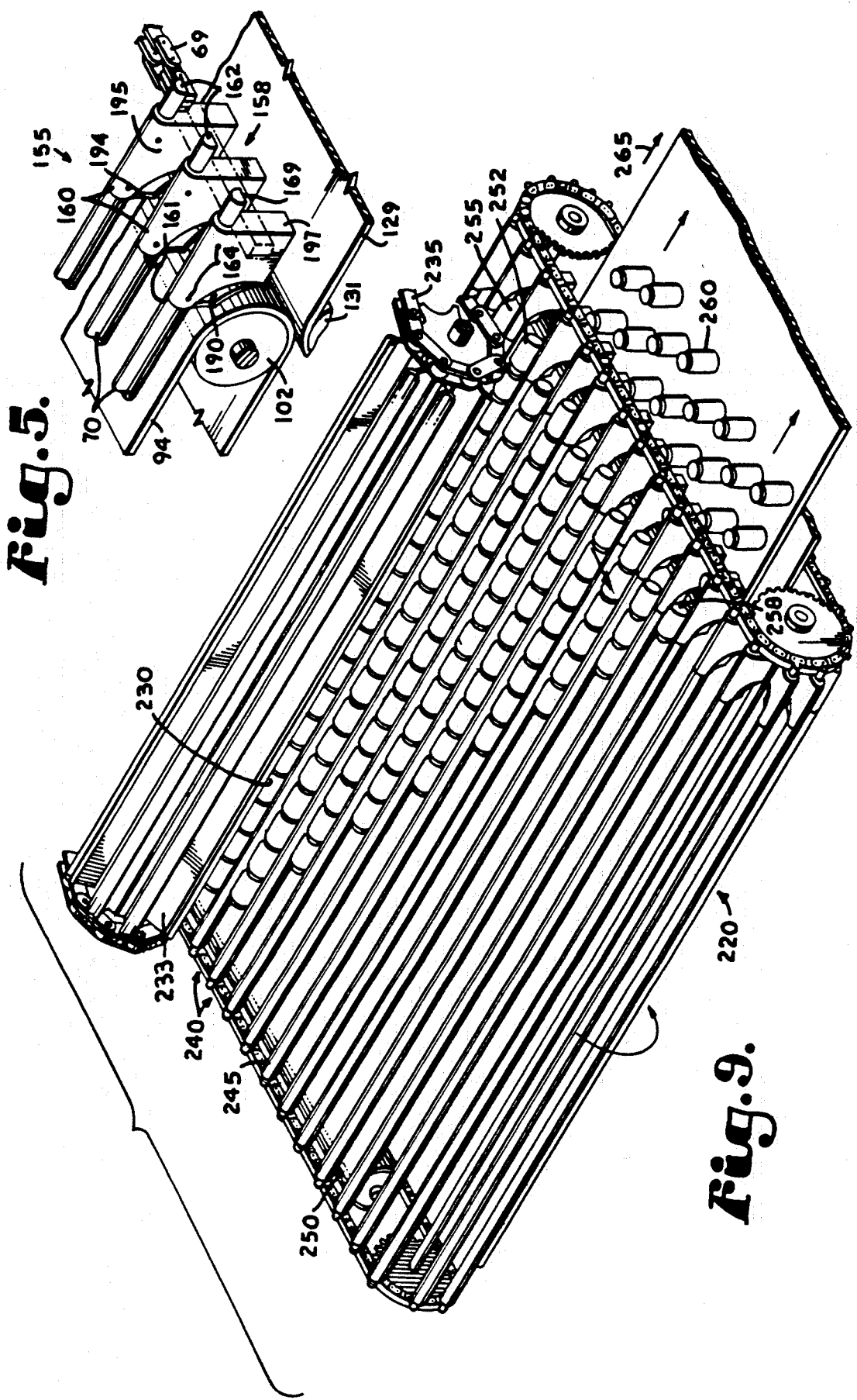

METHOD OF HYDROSTATIC COOKER DISCHARGE

This is a divisional application of parent application Ser. No. 07/453,391, filed Dec. 18, 1989, having a title of HYDROSTATIC COOKER DISCHARGE now abandoned.

FIELD OF THE INVENTION

The present application relates to a hydrostatic cooker apparatus and process for rapidly and efficiently continuously discharging processed containers of canned goods from hydrostatic cookers.

BACKGROUND OF THE INVENTION

Many types of foods are packaged in discrete packages or cans and then cooked while being slowly conveyed through a heated chamber. Multiple packages are simultaneously processed within the chamber.

The capacity of hydrostatic cookers to process foods is generally limited not only by the ability to quickly and reliably load filled containers into the cooker, but also by the ability to quickly and reliably discharge filled containers from the cooker. Problems associated with discharging are magnified when the containers must be unloaded continuously to maintain process control.

In the processing of canned foods by conventional apparatus, cylindrical containers, cans or jars are placed along a common horizontally aligned axis end-to-end and form a grouping, commonly referred to as a "stick". Each stick is positioned on a respective flight or tray attached to an endless conveyor chain which continuously transports the containers through the various processing stages of the cooker and returns them to a discharge port of the cooker. Typically the stick of containers is of the order of seven feet in length. The number of containers in each stick is determined by the axial length of each of the containers in the stick. The diameter range of the containers in the sticks is determined by the particular design of ribs in links of the cooker chain and the curvatures of sprockets and profiles of the chain as same is routed through the cooker.

Upon reaching the discharge port, which completes a cycle of the cooker processes, an entire stick of containers must be simultaneously dumped, ejected or otherwise discharged from a pocket of the cooker chain freeing up one link of the hydrostatic cooker flight chain such that another stick of unprocessed containers can be inserted therein, thus beginning another cycle of cooker processing as to that flight of the cooker chain. However, the various discharge apparatus associated with prior art cookers have experienced difficulty in controlling discharged containers, especially at high speed.

Therefore, a decided need exists for an improved apparatus and procedure which is coordinated and synchronized with the cooker flight chain, regardless of the linear velocity thereof, which quickly and efficiently removes discharged sticks of containers under control from the vicinity of the exit port of a hydrostatic cooker while maintaining the forward speed of the drive chain at an optimal rate to properly cook the food at a desired temperature while in the cooker.

Another requirement of the discharge apparatus is to transport the discharged, processed containers rapidly and effectively away from the discharge port of the cooker chain. Failure to perform this requirement quickly leads to substantial congestion near the discharge port of the cooker chain in the form of jammed, damaged or broken containers. This is particularly important since any interference which sufficiently interrupts the flow of containers from the hydrostatic cooker such that the cooker chain must be stopped will alter the residence time of containers currently in transit through the steam dome of the hydrostatic cooker and thereby affect the quality of cook of the contents of such containers.

SUMMARY OF THE INVENTION

An improved hydrostatic cooker discharge apparatus is provided to remove cans or the like containing various food products from a continuously operated hydrostatic cooker. The apparatus includes a mechanism for automatically collecting a horizontally-oriented stick of processed containers of food which have been discharged from the exit port of a conveyor flight chain of a hydrostatic cooker. As each stick of horizontally-oriented containers roll out of the turret of the cooker chain, such stick is gravitationally deposited in an empty flight of a dispersing conveyor system which is coordinated and synchronized with the conveyor chain flights. Similarly, container sticks in adjacent conveyor chain flights are deposited sequentially in adjacent flights of the dispersing conveyor.

As each stick of containers is deposited in the dispersing conveyor, the flights thereof transport the sticks away from the cooker exit port in a direction perpendicular to the longitudinal axis of the stick. A transfer conveyor which is positioned immediately underneath the upper flights of the dispersing conveyor provides a shelf which supports the containers in the flights of the dispersing conveyor.

The shelf is operably provided by an upper run of an endless, flat belt conveyor which moves in a direction which is perpendicular to the direction of travel of the flights of the dispersing conveyor. Thus, as the dispersing conveyor moves the stick containers away from the exit port of the cooker chain in a radial direction relative to the containers, the shelf or transfer conveyor moves the container sticks in an axial direction. The belt of the shelf conveyor cascades downward to make a return run near one side of the dispersing conveyor, and thereat each container of each stick sequentially enters a "waterfall" cell or structure wherein the containers are reoriented from a horizontal position to an upright position such that the containers sit on a relatively flat end thereof on another flat belt conveyor or discharge conveyor, which continues to move the containers in the same general direction as that of the shelf or top run of the transfer conveyor, thereby transporting the containers away from the cooker discharge continuously and properly oriented for further handling.

The linear velocity of the transfer conveyor is coordinated with the linear velocity of the dispersing conveyor such that all containers of each stick have been transported by the transfer conveyor through the waterfall structure in a time frame which is less than that required for the flights of the dispersing conveyor to travel a distance equal to the width of the discharge conveyor such that all containers are reliably placed upright on the flat belt of the discharge conveyor to be transported thereby.

For hydrostatic cookers with more than one processing chain conveyor, each exit port corresponding to the processing chain conveyors is equipped with an independently operated set of dispersing, transfer and discharge conveyors.

OBJECTS OF THE INVENTION

Therefore, the objects of the present invention are: to provide an apparatus and a method which quickly and reliably handles discharged stick containers in such a manner to obtain efficient dispersement thereof from the flights of an endless chain of a hydrostatic cooker regardless of the linear velocity thereof; to provide an apparatus and method such that the excessive time constraints normally imposed upon unloading procedures of the flights of a continuously moving endless chain (conveyor) of a hydrostatic cooker are reduced; to provide a discharge apparatus system and method for a hydrostatic cooker which reduces or eliminates the constraints which normally lead to damaging, jamming or breaking of food containers; and to generally provide an apparatus which is relatively easy to use, simple to maintain, easy to operate efficiently and reliably, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an enlarged front elevational view of the hydrostatic cooker discharge apparatus of this invention.

FIG. 3 is an enlarged and fragmentary cross-sectional view of a turret and dispersing flight conveyor of the discharge apparatus.

FIGS. 4a and 4b are end-to-end portions of a cross-sectional and fragmentary view of the dispersing flight conveyor, a transfer conveyor and a discharge conveyor of the discharge apparatus, taken along line 4—4 of FIG. 2.

FIG. 5 is an enlarged and fragmentary perspective view of a waterfall arrangement of the discharge apparatus.

FIG. 6 is an enlarged and fragmentary side elevational view of the waterfall arrangement of the discharge apparatus.

FIG. 7 is an enlarged and fragmentary cross-sectional view of product control cells of the discharge apparatus, taken along line 7—7 of FIG. 6.

FIG. 8 is an enlarged and fragmentary top plan view of the product control cells.

FIG. 9 is a perspective schematic view of a modified discharge apparatus in accordance with the present invention.

DETAILED DESCRIPTION OF THE INVENTION

Figure 1:
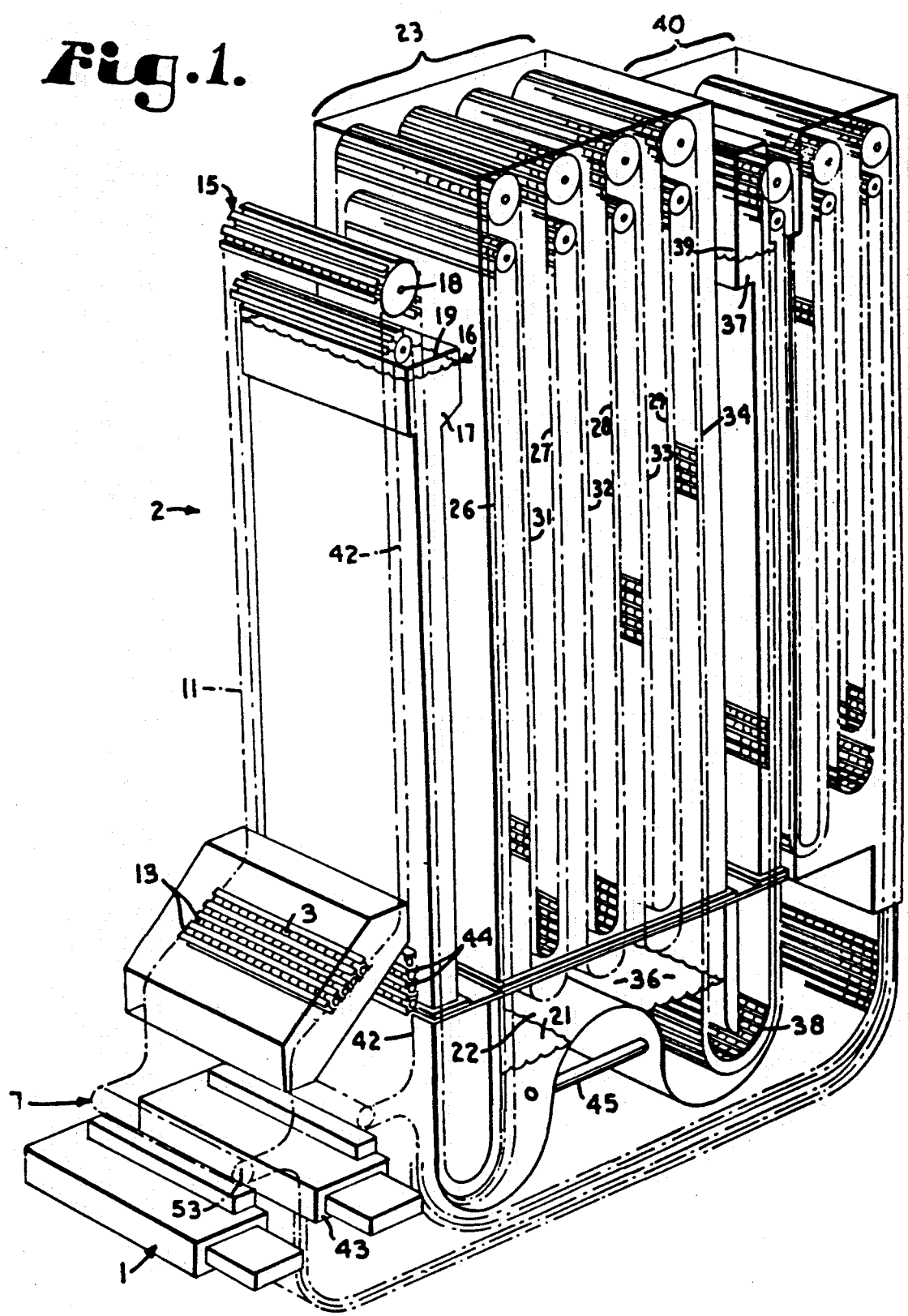
FIG. 1 is a fragmentary perspective and partially schematic view of a hydrostatic cooker, including a discharge apparatus according to the present invention with interior elements shown.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words (and derivates thereof) "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. "Upstream" and "downstream" relate to the product flow path.

The reference numeral 1 generally refers to a discharge apparatus in accordance with the present invention. The discharge apparatus is shown mounted on a hydrostatic cooker 2 in FIG. 1. Cookers, such as the illustrated cooker 2, are known in the industry and have been previously described in U.S. Pat. No. 3,286,619 issued to Harold B. Lee, which is incorporated herein by reference. Of particular interest herein are the parts of the hydrostatic cooker 2 as such parts relate to and interface with the discharge apparatus 1 according to the present invention.

In an associated canning process (not shown) containers 3 are filled with food and sealed. After being transported through an infeed apparatus (not shown) similar to that described in a co-pending patent application, having Serial No. 07/415,084 and entitled HYDROSTATIC COOKER INFEED, which is incorporated hereby by reference, the batches of food containers or the like in the form of sticks are delivered to a loading station 7 of the cooker 2.

At the cooker loading station 7, means such as structural curvature are provided to allow substantial displacement between the outer extremities 8 of ribs or keepers 9 of adjacent links 10 of an endless flight conveyor drive chain 11 so as to form open pockets 12 between adjacent keepers 9, such that the containers 3 may be received therein. As the links 10 progress past the loading station 7, the curvature of the drive chain 11 is decreased, such that the extremities 8 of the ribs 9 approach each other, so that the pockets 12 close around and effectively retain the containers 3 therein for routing through the cooker 2.

Preferably, a plurality of the filled, closed containers are positioned horizontally end-to-end in each pocket 12 of the endless flight conveyor chain 11 to form a "stick" 13 of containers 3 therein as shown in FIG. 1. The loading station 7 of the cooker 2 is generally open to the ambient atmosphere.

The first phase of the routing of the container sticks 13 through the cooker 2 involves transporting the container sticks 13 to a location indicated by the reference arrow 15 where the elevation of the sticks 13 is greater than the level of an upper surface 16 of a water column 17, which typically has a height on the order of approximately 40 feet. After reaching the location indicated by the arrow 15, the cooker flight conveyor chain 11 then cascades over a sprocket 18 such that the food container sticks 13 are transported downwardly through an upper surface 19 of the water column 17, as shown in FIG. 1. The diameter of the sprocket 18, as well as the curvature of the flight chain 11 throughout its coursing through the cooker 2, is less than a certain minimum amount such that the extremities 8 of ribs 9 of adjacent links 10 of the cooker flight chain 11 will remain in sufficiently close proximity to each other such that the containers 3 cannot escape from the pocket 12 therebetween but, instead, will be retained therein.

As the container sticks 13 continue their progress downwardly through the water column 17, the container sticks 13 are subjected to an increasing head of pressure. The flight chain 11 then transports the containers 3 through a lower surface 21 of the water column 17. Routing the sticks 13 through the water column 17 serves to preheat the food containers 3 and to maintain steam in a subsequent steam chamber 22.

In particular, as the containers 3 emerge through the lower water column surface 21, they enter the steam chamber 22 containing steam under somewhat greater than atmospheric pressure in a main cooking and sterilizing portion 23 of the cooker 2. The difference in elevation between the upper water surface 19 and the lower surface 21 of the water column 17 effectively maintains the steam in the chamber 22 and is generally proportional to the temperature and pressure of the steam in the chamber 22, that is, the temperature and steam pressure to which the food container sticks 13 will be subjected during passage through the cooking and sterilization portion 23. The pressure of the steam in the chamber 22 provides the hydrostatic force which maintains the elevation differential between the surfaces 19 and 21 of the water column 17.

Cooking and sterilization is a function of time and temperature. Therefore, the residence time required at a particular temperature prescribes the required linear velocity of the flight chain 11. The drive chain 11 in the cooker portion 23 is serpentine and is reeved through four vertical upward flights 26, 27, 28, and 29, and four downward flights 31, 32, 33, and 34, as shown in FIG. 1; however, the number of flights can vary between different cookers.

After the food containers 3 have spent sufficient residence time in the cooking and sterilizing portion 23 of the cooker 2, the chain 11 conveys the container sticks 13 through a lower surface 36 of a leg of a second water column 37 to begin a cooling down procedure. (When the containers 3 have been transported through the surface 36, the contents of now processed sticks 38 have been fully cooked.) As with the pre-heating water column 17, the difference in elevation between an exit surface 39 and the entry surface 36 of the cooling water column 37 is maintained by the steam pressure generated in the cooking and sterilizing portion 23.

As processed container sticks 38 on the chain 11 emerge through the exit surface 39 of the cooling water column 37, the sticks 38 are subjected to further temperature reduction in a cooling portion 40 of the cooker 2. After sufficient residence time in the cooling portion 40 such that the temperature of the processed container sticks 38 has been reduced to an acceptable handling level, the chain 11 routes the processed sticks 38 back to the vicinity of the loading station 7 of the cooker 2 to be discharged by the discharge apparatus 1 prior to reaching the loading station 7, so that incoming uncooked, closed, filled container sticks 13 can be loaded and cycled through the cooker 2.

As shown in FIG. 1, a second flight chain 42, with a separate cooker discharge apparatus 43, which is substantially identical to the cooker discharge apparatus 1, is configured to concurrently and independently cycle other food container sticks 44 through the cooker 2 so that greater utilization of the cooker 2 can be realized. The cooker drive chains 11 and 42, with container sticks 13 and 44 respectively carried thereby, are reeved in close proximity to each other and generally follow a similar path adjacent to one another. In addition, the second chain 42 can be operated at a linear velocity different from that of the first chain 11, thereby providing the ability to simultaneously process two different types of foods which may require substantially different residence times in the cooker 2. It is foreseen that the number of flight chains routed through the cooker 2, utilizing output apparatus according to the present invention, can even be greater than the two schematically shown in FIG. 1, the actual number being limited only by the physical design capacity of the cooker 2 and its related structure.

A feature of the cooker 2 is that incoming uncooked containers 13 tend to reduce the average temperature of the pre-heating water column 17, whereas the incoming uncooked containers 38 tend to increase the average temperature of the cooling water column 37. To overcome these undesirable tendencies, circulating means (not shown) are provided to transfer water through conduits, such as that shown at 45 in FIG. 1, between the two water columns 17 and 37.

The cooker discharge apparatus 1 is generally shown in FIGS. 2, 4a and 4b. The discharge apparatus 1 is utilized in conjunction with the hydrostatic cooker 2 after processing the filled, closed food containers 3. The cooker discharge apparatus 1 includes a dispersing conveying system 46, a transfer conveying system 47, and a discharge conveying system 48, which are mounted in rigid frame means, such as the frame 49 shown in FIG. 2, with appropriate supporting, anchoring, connecting and cross stiffener members (not shown).

After the container sticks 50 have been processed through the cooker 2, the sticks 50 are returned by the endless flight chain 11 of the cooker 2 to a station 51 having a sprocket 53 in close proximity to the loading station 7 where the container sticks 13 were initially loaded for processing through the cooker 2. While the cooker chain 11 circumnavigates the sprocket 53, outer extremities 8 of the ribs 9 of each adjoining pair of links 10 diverge from each other so that the container sticks 50, such as that designated 57 in FIG. 3, is gravitationally expelled from the chain 11 onto a turret 58 with open pockets similar to those of the cooker chain 11, such as are indicated by the referenced arrow 59 in FIG. 3. Preferably, the turret 58 rotates with a uniform angular velocity in a direction indicated by the referenced arrow 60 with the pockets 59 in synchronized coordination with an opening flight 12 of the cooker chain 11 such that the container sticks 50 are sequentially and readily gravitationally deposited directly therein.

Spaced along side and below the turret 58 is a container shield 63 to constrain the sticks 50 in the turret 58 until the sticks 50 are discharged therefrom onto a transition plate 64, such that the sticks 50 are guided into flight voids 66 of an underlying dispersing conveyor 67 of the dispersing conveying system 46.

The dispersing flight conveyor 67 is continuously moving in a direction indicated by the referenced arrow 68 away from the turret 58. A pair of continuous spaced chains 69, which support the ends of flight bars 70 of the dispersing conveyor 67 are entrained over head sprockets 72 mounted on a shaft 73 and over driven or tail sprockets 75 mounted on a shaft 76. In one application of the present invention, the overall length of each flight bar 70 of the dispersing conveyor 67 is slightly greater than nine feet.

Coaxial with the sprockets 75 and mounted on the shaft 76 is a first coordinating or synchronizing sprocket 78 which is interconnected by an endless chain 79 to a second coordinating sprocket 81 and idler sprockets 82.

Near the end of the shaft 73 is a driven sprocket 84 which is interconnected by an endless chain 85 to a power sprocket 87, which is rigidly secured to a prime mover or motor 88. The sprockets 72, 75, 78, 84 and 87 are type B sprockets with keyway at TDC having taper lock bushings or the like.

The chain 85 transfers power from the prime mover 88 to the dispersing flight conveyor 67, through sprockets 87, 84 and 72. Simultaneously, the sprocket 78, through chain 79 and sprocket 81, coordinates the linear velocity of the dispersing flight conveyor 67 with the effective linear velocity of the turret 58 such that the dispersing conveyor 67 disperses all of the container sticks 50 discharged from the cooker chain 11 at the desired rate. The chain 79, the shield 63 and the plate 64 are adapted to coordinate and synchronize the voids 66 between the flight bars 70 of the dispersing conveyor 67 such that the container sticks 50 are deposited directly into the flight voids 66 of the dispersing conveyor 67. Means for accurately coordinating and synchronizing the dispersing conveyor 67 with the turret 58 is provided by a phase adjusting hub 90.

Immediately below an upper run 91 of the dispersing flight conveyor 67 and substantially parallel therewith is a transfer conveyor 93 of the transfer conveying system 47 (see FIGS. 4a and 4b). Transportation of the container sticks 50 along the transfer conveyor 93 is provided by an endless, flat belt 94 which serves to support the container sticks 50 deposited in the voids 66 of the dispersing conveyor 67 while above the transfer conveyor 93. Typically, the belt 94 is 48 inches wide but it is to be understood that other widths are equally applicable as needed to adapt the present invention to a particular application.

An upstream end 97 of the transfer conveyor belt 94 is entrained over a first end roller 99 and a downstream end 101 is entrained over a second end roller 102 of the transfer conveyor 93. Intermediate between the two end rollers 99 and 102 and beneath a flat upper run 104 thereof, the belt 94 is also entrained over idler rollers 105 and over a drive pulley or roller 107 which, along with a drive sprocket 108, is rigidly secured to a rotatable shaft 110.

Power for the transfer conveyor belt 94 is provided by an endless chain 111 interconnecting sprocket 108 with a power sprocket 113 which is rigidly secured to a drive shaft 114 of a prime mover or motor 116. Adjustment means, such as a bearing slide 117, a take-up spacer 118, a take-up bracket 119, a screw block 120 and a take-up screw 121, as 29 illustrated in FIG. 4a, may be used to adjust the tension in the transfer conveyor belt 94.

The flat upper run 104 of the transfer conveyor 93 extends, at least, under the entire length of the container sticks 50 as they are deposited in the voids 66 of the dispersing conveyor 67. Extending from beneath the transition plate 64 to or slightly above the upper run 104 of the transfer conveyor 93 and substantially coplanar therewith is a transition ramp 123 which supports the sticks 50 within the dispersing conveyor flight voids 66 prior to the location whereat the sticks 50 are transported onto the dispersing conveyor belt 94. The direction of travel indicated by the referenced arrow 125 of the upper run 122 of the transfer conveyor 93 (FIG. 4a) is substantially perpendicular to the direction of travel indicated by the arrow 68 of the flights 70 of the dispersing conveyor 67 (FIG. 3). The actual sense of the direction of travel indicated by the arrow 125 of the transfer conveyor 93 may be either rightwardly or leftwardly relative to the motion of the dispersing conveyor 67, whichever direction is needed for transporting the container sticks 50 to a packaging and distribution region indicated by the referenced arrow 126 (FIG. 4b) of the manufacturing facility.

Positioned immediately below the downstream roller 102 of the transfer conveyor 93 is a discharge conveyor 128 of the discharge conveying system 48 with an endless flat belt 129. Preferably, the general direction of travel indicated by the arrow 126 of the belt 129 of the discharge conveyor 128 is substantially the same as the direction of travel indicated by the arrow 125 of the transfer conveyor 93.

The discharge conveyor belt 129 is entrained over a head roller 131, a tail roller 132, a drive roller 134, and idler rollers 135. A sprocket 137 and the drive roller 134 are rigidly secured to a rotatable shaft 138 which is driven by a prime mover or motor 140 through an endless chain 141 entrained over a sprocket 142 and the sprocket 137.

A belt tensioning mechanism 144, similar to that described for transfer conveyor roller 99, may be used in 7 conjunction with the drive roller 134, as illustrated in FIG. 4b.

A downstream end 145 of the discharge conveyor 128 is pivotally and rotatably supported by a pivot stand 147 such that an upstream end 148 of the discharge conveyor 128 may be raised or lowered in relation to the downstream roller 102 of the transfer conveyor 93 for purposes more clearly described hereinafter. The actual pivotal adjustment of the discharge conveyor 128 is accomplished with angle brackets 150, threaded rods 151 and stop nuts 152, such as that illustrated in FIG. 4b, or the like. Manipulation of the nuts 152 causes the discharge conveyor 128 to rotate about a pivot or fulcrum 153 thereby adjusting the displacement of the belt 129 relative to the transfer conveyor 93.

Each end of the dispersing flight conveyor 67 is entrained over large end sprockets 72 and 75 or, alternativly, over a plurality of smaller sprockets, such that sufficient internal spacing exists between the upper run 91 and a lower run 154 thereof whereby the dispersing conveyor 67 largely encircles a major portion of the transfer conveyor 93 and the upstream end 148 of the discharge conveyor 128, permitting the two conveyors 93 and 128 to operate therein without interference from, or interfering with, the dispersing conveyor 67.

The linear velocity of the transfer conveyor belt 94 is such that an entire stick of containers 50 in the flight void 66 of the dispersing conveyor 67 is transported to and over the downstream roller 102 of the transfer conveyor 93 in less time than is required for the flights bars 70 of the dispersing conveyor 67 to travel a distance approximately equal to the width of the discharge conveyor belt 129.

At the downstream end 101 of the transfer conveyor 93 where the endless belt 94 cascades downward around the roller 102, a region exists where individual containers 157 of the sticks 50 fall over the end of the belt 94 onto the belt 129 commonly referred to as a "waterfall" 155. In particular, a downstream-most container 157 in each flight void 66 of the dispersing conveyor 67 enters a product control cell 158 (see FIG. 8), one of which is situated at the downstream end 101 of the transfer conveyor belt 94 in communication with each flight void 66 of the dispersing conveyor 67. Each cell 158 is formed between a pair of adjacent cell shoes 160 (see FIG. 5) located near downstream ends 161 of adjacent flight bars 70, having outwardly projecting tails 162. Each shoe 160 has a throughbore 163 which is telescoped over the tail 162 of the flight bar 70 where the flight bar 70 extends beyond the flat upper run 104 of the transfer conveyor 93. One shoe 160 is rigidly threadedly secured to each dispersing flight bar 70 with bolts 164 positioned in opposing countersunk bores 165 extending into the flight bars 70 such that each shoe 160 is positioned substantially vertically from and perpendicular to the discharge conveyor belt 129. The shoes 160 space between adjacent cells 158.

A keyway 167 is broached, milled or otherwise formed in the throughbore 163. Each keyway 167 communicates with another keyway 168 formed in the flight bar 70. The keyways 167 and 168 have 90-degree corners and are true with a flat shoulder 169 at the ends of the flight bars 70 for attaching to the chains 69 as hereinafter described.

Completely encircling and fitted around each flight bar 70 of the dispersing conveyor 67 is a low-friction sleeve 170 with an inner diameter dimensioned substantially similar to the diameter of the flight bar 70 where the sleeve 170 fits therearound. Each sleeve 170 extends longitudinally along the flight bar 70 from a station 172, which is upstream from where the container sticks 50 are deposited on the dispersing conveyor 67, to the upstream end 173 of an associated cell shoe 160 secured to the flight bar 70, abutting thereagainst. As the dispersing conveyor flight bars 70 move across the transversely moving transfer conveyor belt 94, the sleeves 170 serve as an anti-jamming mechanism such that individual containers (reference numeral 174 in FIG. 7) in the flight voids 66 will more reliably move toward the waterfall 155 as urged endwise therealong by the transfer conveyor belt 94. Alternatively, the cross-sections of the flight bars 70 and the sleeves 170 may have rectangularly shaped profiles. In one application of the present invention, the overall axial length of the sleeve 170 is approximately 7'10".

An upper profile of each shoe 160 is substantially semi-circular with substantially the same diameter as the sleeves 170 so as to eliminate interference at a joint 175 between the shoe 160 and the sleeve 170 with the containers 174 moving therealong.

Each shoe 160 has a curved lower surface 176, the center of curvature thereof being substantially the same as that of the transfer conveyor belt 94, such that the shoes 160 curve around the downstream roller 102. The curved lower surface 176 continues along the downward curvature of the transfer conveyor belt 94 until the shoe 160 reaches an angular displacement which is greater than ninety degrees from the beginning of the curved surface 176 but is still spaced above the discharge conveyor belt 129 at which location a bottom portion 178 of each shoe 160 becomes substantially planar and is substantially parallel to an upper surface 179 of the discharge conveyor belt 129.

Chain links 181 are threadedly rigidly secured to each shoulder 169 by a plurality of bolts received in tapped partial bores 182 in the ends 161 of the flight bars 70. Similarly, links 181 are threadedly rigidly secured to a respective shoulder 184 at the upstream end of each flight bar 70. The shoulder 184 is parallel to and coplanar with the shoulder 169.

The links 181, when connected together with other links 185, form the chains 69 at each end of the flight bars 70 which are entrained around the sprockets 72 and 75. A rail 187, which extends from close proximity to sprocket 72 to close proximity to sprocket 75 and which is spaced substantially parallel with the upper run 104 of the transfer conveyor 93, supports the upper run 91 of the dispersing conveyor 67. Containers 188 (see FIG. 6) pass beneath the chain 69 and the rail 187 of the dispersing conveyor 67 while being transported by the discharge conveyor 128.

Rigidly secured to the curved lower surface 176 is a product transfer guide 190 which frictionally controls the fall of each container 157 from a horizontal orientation as illustrated by container 191 on the transfer conveyor 93 to an upright orientation as illustrated by container 192 on the discharge conveyor 128. An edge 194 of the guide 190 facing the cells 158 has a 45° chamfer. A plurality of countersunk throughbores (not shown) in the guides 190 communicating with a plurality of tapped partial bores (not shown) in the curved lower surface 176 of each shoe 160 receive bolts for threadedly securing the guides 190 to the curved lower surface 176 of the shoes 160. Thus, the guides 190 are readily removable for installation of other guides having various shapes and profiles for handling different sizes and types of containers.

By lifting containers such as container 157 in FIG. 8 up and off the belt 94 during the reorientation procedure, the guides 190 also help to minimize or eliminate any tendencies for such containers 157 to rotate or gyrate as they plunge over the waterfall 155 and to otherwise stabilize each upright container 192 in its upright position when same comes in contact with the moving belt 129 of the discharge conveyor 128.

The discharge conveyor 128 is operated at a linear velocity which is sufficient to eliminate any tendency for upright containers 192 being deposited thereon to topple forward while removing the containers 192 to a point where they do not interfere with other containers 192 being subsequently deposited thereon. At the same time, the discharge conveyor 128 must be operated at a velocity which is sufficiently small that the containers 192 are not caused to topple over backward relative to the motion of the discharge conveyor belt 129.

Of importance in coordinating the velocities of the transfer conveyor 93 with the discharge conveyor 128 in order to avoid interference and congestion in the cells 158 is the ratio of the height to the diameter of the containers 157. Particularly, the linear velocities thereof must be such that the discharge conveyor 128 travels a distance greater than the diameter of the containers 157 while the transfer conveyor 93 travels a distance equal to the height of the containers 157.

The cells 158 move along with the flight bars 70 of the dispersing conveyor 67. Therefore, the containers 192, after plunging over the waterfall 155 and coming to rest in an upright position on the discharge conveyor belt 129, come in contact with an upstream cell wall 195 of the cell 158. After coming into contact with the upstream wall 195, the container 192 remains in contact therewith while simultaneously moving toward the open end of the cell 158 by being frictionally urged theretoward by the underlying, continuously moving belt 129 of the discharge conveyor 128.

In a relatively short time, the upright containers 192 are transported beyond the distal end 197 of the cell wall 195 where the containers 192 are no longer in contact with the cell wall 195. Thereafter, the containers, such as container 198 in FIG. 8, are no longer forced to slide sideways on the discharge conveyor belt 129 due to contact with the cell wall 195 but, instead, are transported uninterruptedly along the discharge conveyor 128 to the packaging and distribution region indicated by the arrow 126 as aforesaid.

A modified hydrostatic cooker discharge apparatus in accordance with the present invention is schematically shown in FIG. 9 and generally designated by the reference numeral 220. Many of the characteristics of the modified discharge apparatus 220 are substantially similar to those previously described for the apparatus 1 and will not be reiterated here in detail.

Of primary importance with the modified discharge apparatus 220 is the placement thereof such that container sticks 230 are gravitationally ejected from open flights 233 of a hydrostatic cooker flight chain 235 directly into consecutive open flights 240 of a dispersing flight conveyor 245 superimposed over an underlying transfer belt conveyor 250, thereby eliminating the need for a turret, a transition plate, or a container shield.

The continuous conveying of the sticks 230 away from the cooker chain 235 while the underlying transfer conveyor 250 transports containers 252 of the sticks 230 axially traversely and over a waterfall 255 where the individual containers 252 of the sticks 230 are reoriented from being in a horizontal position 258 to being in a vertical position, such as containers 260, for transportation to a packaging and distribution region (not shown), as indicated by the referenced arrow 265.

It is to be understood that the containers handled by the discharge apparatus may be constructed of glass, plastic, metal, fiber or the like. In the case of steel or tin containers, a permanent magnet, such as those constructed of ceramic material, may be positioned immediately below the belt 129 of the discharge conveyor 128 in close proximity to the waterfall 155 to assist with stabilization of such containers as they navigate the waterfall 155. Other possible alternatives in lieu of a permanent magnet as aforesaid include a vacuum bed to assist with stabilization of aluminum, glass or like containers, and a cushioning type belt for absorbing the impact of glass containers when navigating the waterfall 155.

It is also to be understood that separate and independently operated discharge apparatus can be used for each chain of a multi-chain hydrostatic cooker.

It is to be further understood that while certain forms of the present invention have been illustrated and described herein, it is not to be limited to the specific forms or arrangement of parts described and shown.

What is claimed and desired to be secured by Letters Patent is as follows:

1. A method for continuously discharging batches of containers of food from an endless flight conveyor chain coursing through a cooker comprising the steps of:
   (a) receiving the containers in a stick expelled from the cooker chain onto a dispersing flight conveyor;
   (b) urging the stick laterally away from the cooker chain by use of said dispersing conveyor while supporting the stick containers in said dispersing conveyor with a first belt conveyor;
   (c) urging the stick containers axially with said first belt conveyor;
   (d) reorienting the stick containers from a horizontal orientation to an upright orientation as the containers are transferred from said first belt conveyor to a second belt conveyor;
   (e) transporting the uprighted containers with said second belt conveyor to another location for further disposition; and
   (f) concurrently repeating steps (a) through (e) for each stick as it is sequentially expelled from the cooker chain.

2. The method according to claim 1 including the steps of:
   (a) receiving the sticks expelled by the cooker into a turret; and
   (b) shield means for selectively transferring the sticks from said turret to said dispersing conveyor.

* * * * *